No. 819,815. PATENTED MAY 8, 1906.
J. C. SLAUGHTER.
ELECTRIC REGENERATOR.
APPLICATION FILED JULY 28, 1902.
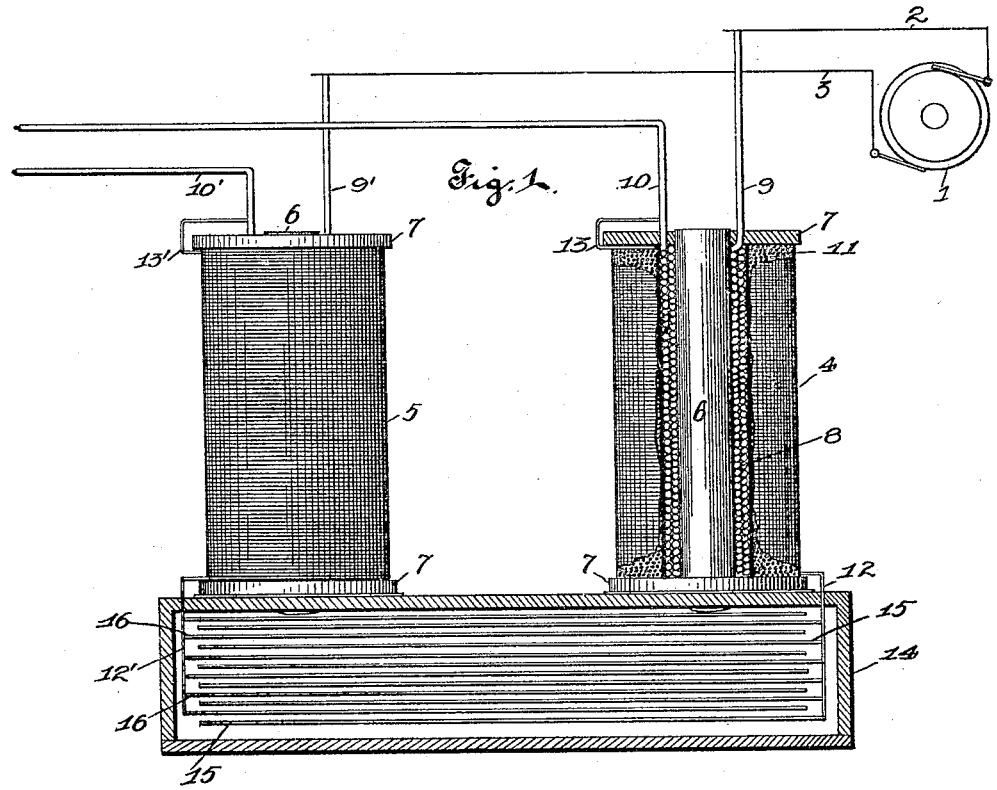
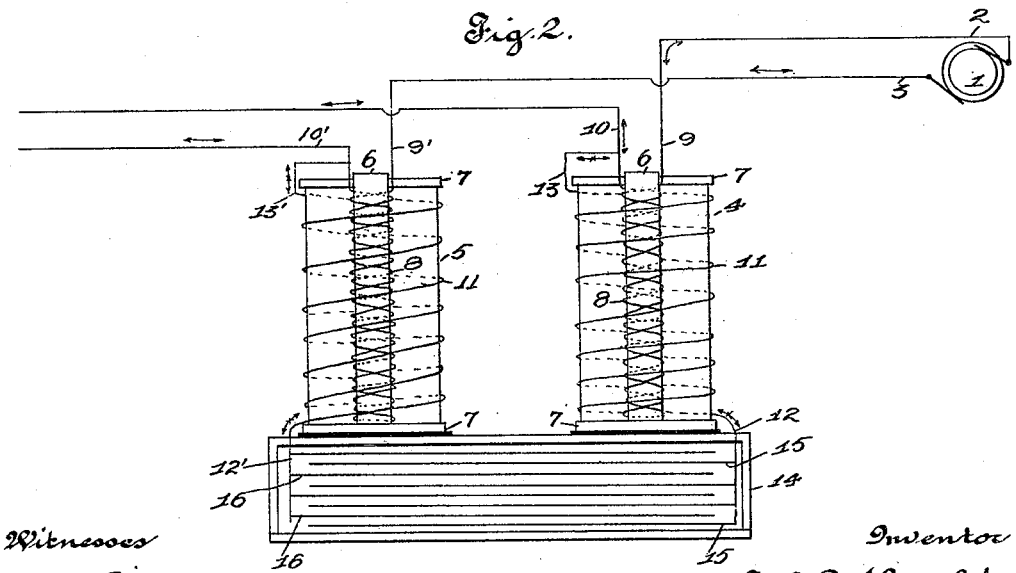
Witnesses
Alfred A. Eicks
M. S. Iron
Inventor
Joel C. Slaughter
by Higdon & Longan attys.

UNITED STATES PATENT OFFICE.

JOEL C. SLAUGHTER, OF DALLAS, TEXAS.

ELECTRIC REGENERATOR.

No. 819,815.  Specification of Letters Patent.  Patented May 8, 1906.

Application filed July 28, 1902. Serial No. 117,409.

*To all whom it may concern:*

Be it known that I, JOEL C. SLAUGHTER, of the city of Dallas, Dallas county, State of Texas, have invented certain new and useful Improvements in Electric Regenerators, of which the following is a full, clear, and exact description, reference being had to the accompanying drawings, forming a part hereof.

My invention relates to improvements in electric regenerators; and it consists of the novel construction, combination, and arrangement of parts hereinafter shown, described, and claimed.

In the drawings, Figure 1 shows a side elevation of my invention and a sectional view of a part of the same. Fig. 2 is a diagrammatic view of my invention.

The object of my invention is to construct a regenerator to be used in connection with an alternating-current generator, whereby the efficiency of the latter is increased—that is to say, owing to the increased efficiency produced by the employment of my invention the alternating current now produced by an alternating-current generator is materially increased.

The application of my invention to an alternating electric plant causes the same to operate with greater economy than heretofore in that it produces a given number of watts upon the expenditure of considerably less fuel than heretofore or it with the same amount of fuel as heretofore used considerably increases the output of watts. This result has been demonstrated by actual use.

Referring to the drawings, and especially to Fig. 1, 1 indicates an alternating-current generator of any desired type, said generator being adapted, of course, to produce an alternating current. 2 indicates one wire leading from said generator, and 3 the other wire leading from the same.

In carrying out my invention I make use of two induction-coils 4 and 5, which are of the same and identical construction, being wound in the same manner, each one of said induction-coils being provided with a soft-iron core 6 and wooden caps and bases 7, adapted to fit snugly over the coils of said induction-coils and also the cores. In view of the fact that both induction-coils are of exactly the same construction I will limit my description to only one of the same. Referring to the induction-coil 4, which, as above stated, is of the same construction as the coil 5, 8 represents the wire forming the primary coil of the induction-coil, said wire being covered with a suitable insulating material. Said primary coil is wound around the soft-iron core 6 in the usual way, as indicated in Fig. 1, and the free ends of said primary coil are indicated by 9 and 10. It will be noted in this connection that the wire composing this primary coil is heavier and of greater diameter than the wire forming the secondary coil.

Wound around the primary coil after being properly insulated is the secondary coil 11, the insulated wire of the secondary coil 11 being finer than that of the primary coil, as heretofore stated, and the free ends of the secondary coil 11 terminating in the portions 12 and 13, the portion 12 being connected as hereinafter described and the portion 13 being electrically and mechanically connected to the primary wire 10.

The wires composing the secondary and primary coils are insulated from each other and may be of any desired comparative diameters relative to each other and may be wound in such a manner as to form any number of layers or helices, depending on the strength of the induction-coils desired.

The induction-coils 4 and 5 are to be used in connection with an electric condenser, which I will now proceed to describe, referring especially to Fig. 1, wherein a sectional view of the same is shown. The condenser is composed of a casing or box 14, on which the two induction-coils 4 and 5 are mounted, said induction-coils being insulated from each other, and in the construction which I have shown the casing 4 is made of wood; but the same may be constructed of any suitable material. Located in said casing is a series of condensing-plates 15 and 16, said condensing-plates being alternately arranged and insulated from each other. The condensing-plates 15 and 16 are formed out of tin-foil or any other suitable material. These plates are insulated from each other by paraffin-paper, mica, or any other suitable insulating material. The series of plates 15 are electrically connected to the wire 12 of the secondary coil of the induction-coil 4. The plates 16 are likewise electrically connected to the secondary coil of the induction-coil 5.

Having described the mechanical construction of my invention, I will now describe the operation of same.

My regenerator is constructed substantially as shown and heretofore described, and when in use the wire 9 of the primary coil is electrically connected to the wire 2, leading from the generator. The other wire 3 of the generator is connected to the wire 9' of the induction-coil 5. The end 12 of the secondary coil 11 is electrically connected to the condensing-plates 15 of the condenser. The other end 13 of said coil is electrically connected to the end 10 of the primary coil. The end 12' of the secondary coil of the induction-coil 5 is electrically connected to the condensing-plates 16 of the condenser, and the other end 13' of the secondary coil of the induction-coil 5 is electrically connected to the end 10' of the primary wire of the induction-coil 5, it being necessarily understood that the ends 10 and 10' may be extended and connected to any point of delivery desired.

In operation the current passes from the electric generator 1 through the wires 2 and 9, 3 and 9', and the primary coils of the induction-coils 4 and 5, and out of said primary coils, through the end portions 10 and 10' of the same, to any point of delivery desired.

While I do not claim to be the inventor of an induction-coil, I do claim that the manner in which the wires forming the induction-coil is connected is new, as far as I know—that is to say, I claim as part of my invention the specific manner herein shown of connecting one end of the secondary coil to the primary coil, thus adding the force or energy gained to the primary coil.

Another feature of my invention is securing the other end of the secondary coil-wire to the electric condensers, thus condensing and storing the electrical energy until the return alternation of the alternating current, when the condenser gives up its stored energy, so to speak, and returns it to the primary coil.

I claim and have found out by a practical experiment that by electrically connecting one end of the secondary coil to the delivery end of the primary coil and the remaining end of the secondary coil to the condensing-plates of the condenser I can materially increase the efficiency of the generators now in use. For instance, I have made a generator and demonstrated the same by attaching it to an alternating current which was delivering one hundred and four volts, and after passing through my regenerator the delivery was one hundred and twenty-two volts.

Having fully described my invention, what I claim is—

1. An electric regenerator, comprising two or more induction-coils, and a condenser; the delivery ends of the primary wires of said induction-coils being connected to the ends of the secondary coils, and the other ends of the primary coils adapted to be electrically connected to an alternating-current generator, and the other ends of the wire forming the secondary coils, being in electrical connection with the condensing-plates of the condenser, substantially as specified.

2. In an electric regenerator, an induction-coil composed of a condenser, a primary and secondary coil, one end of the secondary coil being attached to the delivery end of the primary coil and the other end of said secondary coil adapted to be attached to the condenser, substantially as specified.

3. In an electric regenerator, the combination of two induction-coils, a condenser connected to the secondary of said coils, and a source of alternating current, one of said induction-coils having its primary connected in series with one of the terminals of said source of alternating current, and the other one of said induction-coils being connected in series with another and different terminal of said source of alternating current, substantially as described.

4. In an electric regenerator, the combination of two induction-coils, a condenser and a source of alternating current, one of said induction-coils having its primary connected in series with adjacent ends of one of the conductors of said source of alternating current, and the other one of said induction-coils being connected in series with two adjacent ends of another and different conductor of said source of alternating current, and both of said induction-coils being connected in multiple with the said source of alternating current, substantially as described.

In testimony whereof I affix my signature in presence of two witnesses.

JOEL C. SLAUGHTER.

Witnesses:
 E. E. LONGAN,
 ALFRED A. EICKS.